(12) United States Patent
Ito et al.

(10) Patent No.: US 6,673,304 B2
(45) Date of Patent: Jan. 6, 2004

(54) APPARATUS FOR HEAT-TREATING A V-TYPE CYLINDER BLOCK BY INDUCTION HEATING

(75) Inventors: Daiji Ito, Yokohama (JP); Shin Okumura, Isehara (JP); Akihiko Hosono, Yokohama (JP); Kazuki Horita, Yokohama (JP)

(73) Assignees: Neturen Co., Ltd., Tokyo (JP); Isuzu Motors Limited, Tokyo (JP)

(*) Notice: Subject to any disclaimer, the term of this patent is extended or adjusted under 35 U.S.C. 154(b) by 186 days.

(21) Appl. No.: 10/041,484

(22) Filed: Jan. 10, 2002

(65) Prior Publication Data
US 2002/0113345 A1 Aug. 22, 2002

(30) Foreign Application Priority Data
Feb. 21, 2001 (JP) ......................................... 2001-044482

(51) Int. Cl.[7] .............................................. C21D 11/00
(52) U.S. Cl. ......................... 266/78; 266/129; 266/249; 219/635
(58) Field of Search ................................. 266/104, 129, 266/130, 131, 78, 249; 219/635, 647

(56) References Cited

U.S. PATENT DOCUMENTS 2,797,289 A * 6/1957 Georgen ..................... 219/635
2,926,112 A * 2/1960 Highfield .................... 219/635
6,024,913 A    2/2000 Ogawa et al.

FOREIGN PATENT DOCUMENTS

JP    7-161461    * 6/1995
JP    7-272845    * 10/1995

* cited by examiner

Primary Examiner—Scott Kastler
(74) Attorney, Agent, or Firm—Sughrue Mion, PLLC

(57) ABSTRACT

In a heat-treatment apparatus for heat-treating a V-type cylinder block (W) by induction heating, the block (W) is fixedly mounted on a work table (11) and set at a reference position thereon. A plurality of induction heating coils (23) are disposed in each of opposite sides of a base frame (10) of the work table (11) through Z tables (21), Y tables (18) and X tables (13). These tables (13, 18, 21) enable the heating coils (23) to enter and exit from the corresponding cylinder bores (Wn) of the block (W) in a direction in parallel with a longitudinal direction of the cylinder bores (Wn). The Z table (21) moves back and forth in parallel with the longitudinal direction of the cylinder bores (wn). The Y table moves back and forth in a direction perpendicular to the rows of the cylinder bores (Wn). The X table (13) moves back and forth in parallel with the rows of cylinder bores (Wn).

19 Claims, 9 Drawing Sheets

APPARATUS FOR HEAT-TREATING A V-TYPE CYLINDER BLOCK BY INDUCTION HEATING

BACKGROUND OF THE INVENTION

1. Field of the Invention

The present invention relates to an apparatus for heat-treating a V-type cylinder block by induction heating, wherein the cylinder block is of a diesel engine and the like used under heavy loads and the apparatus is employed to produce, for example, a predetermined mottled pattern of a plurality of quenched layer portions arranged in an inner peripheral surface of each of a plurality of cylinder bores of such cylinder block.

2. Description of the Related Art

For example, in an inner peripheral surface of a cylinder bore of a diesel engine and the like used under a heavy load, there is formed a mottled pattern of individually quenched layer portions through a conventional inner surface quenching method. In this connection, the applicant of the present application has already proposed an induction heating coil and an induction quenching method in Japanese Patent Laid-Open Nos. Hei 7-161461 and Hei 7-272845.

However, such conventional quenching method with induction heating is disadvantageous in that: when a center of the cylinder bore deviates from that of the induction heating coil to fail to keep constant a clearance between an inner peripheral surface of the cylinder bore and an outer peripheral surface of the induction heating coil, the induction heating coil fails to evenly heat the inner peripheral portion of the cylinder bore, which makes it impossible to produce a constant pattern of quenched portions of the cylinder bore, so that the quenched portions of the cylinder bore differs from each other also in quenching depth. Consequently, in order to produce the constant pattern of quenched portions of the cylinder bore, it is necessary for the induction heating coil to position its center within a radius of several tens of microns from the center of the cylinder bore when the quenching of the cylinder bore is carried out. However, such positioning operation of the induction heating coil is very cumbersome when an engine's cylinder block is provided with a plurality of the cylinder bores to be quenched. Due to such cumbersomeness, the positioning operation of such a single induction heating coil described above is not suitable for a quenching method for mass production.

Consequently, in order to solve the above problem, the inventors of the present invention have disclosed their previous invention entitled "PRECISION QUENCHING APPARATUS AND METHOD WITH INDUCTION HEATING" (for heat treatment of an in-line type cylinder block) in Japanese Patent Laid-Open No. Hei 8-225846, which invention was also filed in U.S.A. and already matured into U.S. Pat. No. 6,024,913 on Feb. 15, 2000. This U.S. Patent is incorporated herein by reference.

Incidentally, the precision quenching apparatus for heat treatment of the in-line type cylinder block of the above previous invention (hereinafter referred to as the previous apparatus) employs a single induction heating coil. In heat treating a workpiece (i.e., the in-line type cylinder block), the workpiece travels while having an inner surface of each of its cylinder bores subjected to heat treatment performed by such a single induction heating coil. Due to this, in the case where another type of workpiece such as a V-type cylinder block provided with a first and a second row of cylinder bores is heat-treated using the previous apparatus, it is necessary for the previous apparatus to perform the heat-treating process twice. In other words, the first row and the second row of the cylinder bores of the workpiece (i.e., V-type cylinder block) are subjected to a first and a second heat-treating process, respectively, which makes the previous apparatus complicated in construction and worse in working efficiency due to the necessity of a longer processing time. The above is a problem inherent in the previous apparatus.

SUMMARY OF THE INVENTION

Consequently, it is an object of the present invention to provide an apparatus for efficiently heat-treating a V-type cylinder block by induction heating necessary to perform a quenching and a tempering operation, wherein the cylinder block is provided with a first and a second row of cylinder bores, both of which rows are simultaneously heat-treated using a plurality of induction heating coils in a condition in which the induction heating coils travel while the cylinder block is held stationarily.

In accordance with a first aspect of the present invention, the above object of the present invention is accomplished by providing:

A heat-treatment apparatus for quenching a V-type cylinder block (W) by induction heating, comprising:

a work table (11) on which the cylinder block (W) is fixedly mounted in a reference position thereon, wherein the work table (11) is fixedly mounted on a base frame (10);

a plurality of induction heating coils (23) each for heating an inner surface of each of a plurality of cylinder bores (wn) of the cylinder block (W); and a transfer table assembly (13, 18, 21) for supporting the induction heating coils (23) in a manner such that each of the heating coils (23) is movable in a reciprocating manner in parallel with a longitudinal axis of each of the cylinder bores (Wn) to enter and exit from each of the cylinder bores (Wn) and also movable in a direction in parallel with each of rows of the cylinder bores (Wn) in a reciprocating manner; wherein the transfer table assembly (13, 18, 21) is movably mounted on each of opposite sides of the base frame (10) to sandwich the work table (11) therebetween.

In accordance with a second aspect of the present invention, the above object of the present invention is accomplished by providing:

The heat-treatment apparatus for quenching the V-type cylinder block (W) by induction heating as set forth in the first aspect of the present invention, wherein the transfer table assembly (13, 18, 21) is constructed of:

an X table (13) which travels in a direction X in parallel with the rows of the cylinder bores (Wn) along an upper surface of the base frame (10);

a Y table (18) movably mounted on the X table (13), wherein the Y table (18) travels in a direction Y perpendicular to the direction X along the upper surface of the base frame (10); and a Z table (21) movably mounted on the Y table (18), wherein the Z table (21) supports the induction heating coils (23) to travel in a direction (Z) along an upper inclined surface of the Y table (18), wherein the upper inclined surface of the Y table (18) extends in parallel with the longitudinal axis of each of the cylinder bores (Wn).

In accordance with a third aspect of the present invention, the above object of the present invention is accomplished by providing:

The heat-treatment apparatus for quenching the V-type cylinder block (W) by induction heating as set forth in the second aspect of the present invention, wherein:

the work table (11) is provided with a reference member (36) for determining a position of each of the cylinder bores (Wn) of the cylinder block (W) in a coordinate system;

the Y table (18) is provided with a position determining means (31) for determining the coordinates of each of the reference member (36) and the cylinder bores (Wn) of the cylinder block (W); and a control means (100) is provided to control in position the transfer table assembly (13, 18, 21) on the basis of the coordinates of each of the reference member (36) and said cylinder bores (Wn) in a manner such that said induction heating coils (23) are capable of entering and exiting from said cylinder bores (Wn) of said cylinder block (W).

In accordance with a fourth aspect of the present invention, the above object of the present invention is accomplished by providing:

The heat-treatment apparatus for quenching the V-type cylinder block (W) by induction heating as set forth in the third aspect of the present invention, wherein the position determining means (31) is movably mounted on the Y table (18) in a manner such that the position determining means (31) is movable in parallel with a longitudinal axis of each of the cylinder bores (Wn) of the cylinder block (W) along the upper inclined surface of the Y table (18).

In accordance with a fifth aspect of the present invention, the above object of the present invention is accomplished by providing:

The heat-treatment apparatus for quenching the V-type cylinder block (W) by induction heating as set forth in the second or the fourth aspect of the present invention, wherein:

each of the induction heating coils (23) is supported on the Z table (21) so as to be rotatable in a direction (θ); and the control means (100) is provided with a control portion (101) for controlling each of the induction heating coils (23) in its rotational motion.

In accordance with a sixth aspect of the present invention, the above object of the present invention is accomplished by providing:

The heat-treatment apparatus for quenching the V-type cylinder block (W) by induction heating as set forth in any one of the second, fourth and the fifth aspect of the present invention, wherein:

the reference member (36) assumes substantially the same V-type shape as that of the cylinder block (W) in cross section, and is provided with a pair of gauge rings (37) each of which is identical in inner diameter with each of the cylinder bores (Wn) of the cylinder block (W); and the position determining means (31) is provided with an inner-diameter measuring head portion (32), and constructed of an inner-diameter measuring instrument for determining a clearance between an inner diameter of the gauge ring (37) and an outer diameter of the inner-diameter measuring head portion (32) of the position determining means (31).

In accordance with a seventh aspect of the present invention, the above object of the present invention is accomplished by providing:

The heat-treatment apparatus for quenching the V-type cylinder block (W) by induction heating as set forth in any one of the third, fourth, fifth and the sixth aspect of the present invention, wherein:

a cooling tank (41) is fixedly mounted on an upper surface of the work table (11) and filled with a cooling liquid in which the cylinder block (W) is immersed, heated by induction heating and quenched by the cooling liquid upon de-energizing of said induction heating coils (23).

In accordance with an eighth aspect of the present invention, the above object of the present invention is accomplished by providing:

The heat-treatment apparatus for quenching the V-type cylinder block (W) by induction heating as set forth in any one of the third to the seventh aspect of the present invention, wherein: the cylinder block (W) has the cylinder bores spaced apart from and parallel to each other at predetermined intervals (A); and, a control means (100) for realizing quenching operation of the cylinder block (W) is provided in the apparatus, the quenching operation comprising the steps of:

1) set a master block (M) at a reference position on the work table (11) in a manner such that the master block (M) has each of rows of its cylinder bores (Mn) aligned with the direction X, wherein the master block (M) is substantially identical in shape and dimensions with the cylinder block (W);

2) move the X table (13) and the Y table (18) to a position in which the position determining means (31) mounted on the Y table (18) coincides in center with the reference member (36) mounted on the work table (11), wherein coordinates (Xo, Yo) of the position are measured;

3) move the X table (13) and the Y table (18) to a first position in which the position determining means (31) coincides in center with a first one (M1) of the cylinder bores (Mn) of the master block (M), wherein coordinates (X1, Y1) of the first position are measured;

4) calculate coordinates (X1+(n−1)A, Y1) of a new position of the X table (13) and the Y table (18) on the basis of the coordinates (X1, Y1) of the first position, in which new position the position determining means (31) coincides in center with an n'th one (Mn) of the cylinder bores of the master block (M), wherein the cylinder bores of the master block (M) are spaced apart from and parallel to each other at predetermined intervals (A);

5) move the X table (13) and the Y table (18) to a "p" position in which the first cylinder bore (M1) coincides in center with the induction heating coil (23), wherein coordinates (Xp, Yp) of the "p" position are measured;

6) store all the coordinates defined above in the control means (100);

7) replace the master block (M) with the cylinder block (W) in the reference position on the work table (11);

8) move the X table (13) and the Y table (18) to a position in which each of the cylinder bores (Wn) of the cylinder block (w) coincides in center with each of the induction heating coils (23), wherein coordinates ((X1+(n−1)A+an), (Y1+bn)) of the position are measured;

9) move the X table (13) and the Y table (18) to a position of coordinates ((Xp+(n−1)A−an), (Yp−bn)) in which an inner surface of an n'th one of the cylinder bores (Wn) of the cylinder block (W) is subsequently subjected to an induction heating and a quenching operation, wherein the "an" and the "bn" are deviation values deviated from set values;

10) quench both the rows of cylinder bores (wn) of the V-type cylinder block (W) in the same manner as that described above.

In accordance with a ninth aspect of the present invention, the above object of the present invention is accomplished by providing:

A heat-treatment apparatus for tempering a V-type cylinder block (W) by induction heating, comprising:

a work table (51) on which the cylinder block (W) is fixedly mounted in a reference position thereon, wherein the work table (51) is fixedly mounted on a base frame (50);

a plurality of induction heating coils (59) for heating an inner surface of each of a plurality of cylinder bores (wn) of the cylinder block (W); and a transfer table assembly (53, 55) for supporting the heating coils (59) in a manner such that each of the heating coils (59) is movable in a reciprocating manner in parallel with a longitudinal axis of each of the cylinder bores (Wn) to enter and exit from each of the cylinder bores (Wn); wherein the transfer table assembly (53, 55) is movably mounted on each of opposite sides of the base frame (50) to sandwich the work table (51) therebetween.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

A quenching operation performed by an induction-heating quenching apparatus of the present invention for quenching a V-type cylinder block by induction heating will be described with reference to FIGS. 1 to 6 which illustrate an embodiment of the quenching apparatus of the present invention.

Figure 1:
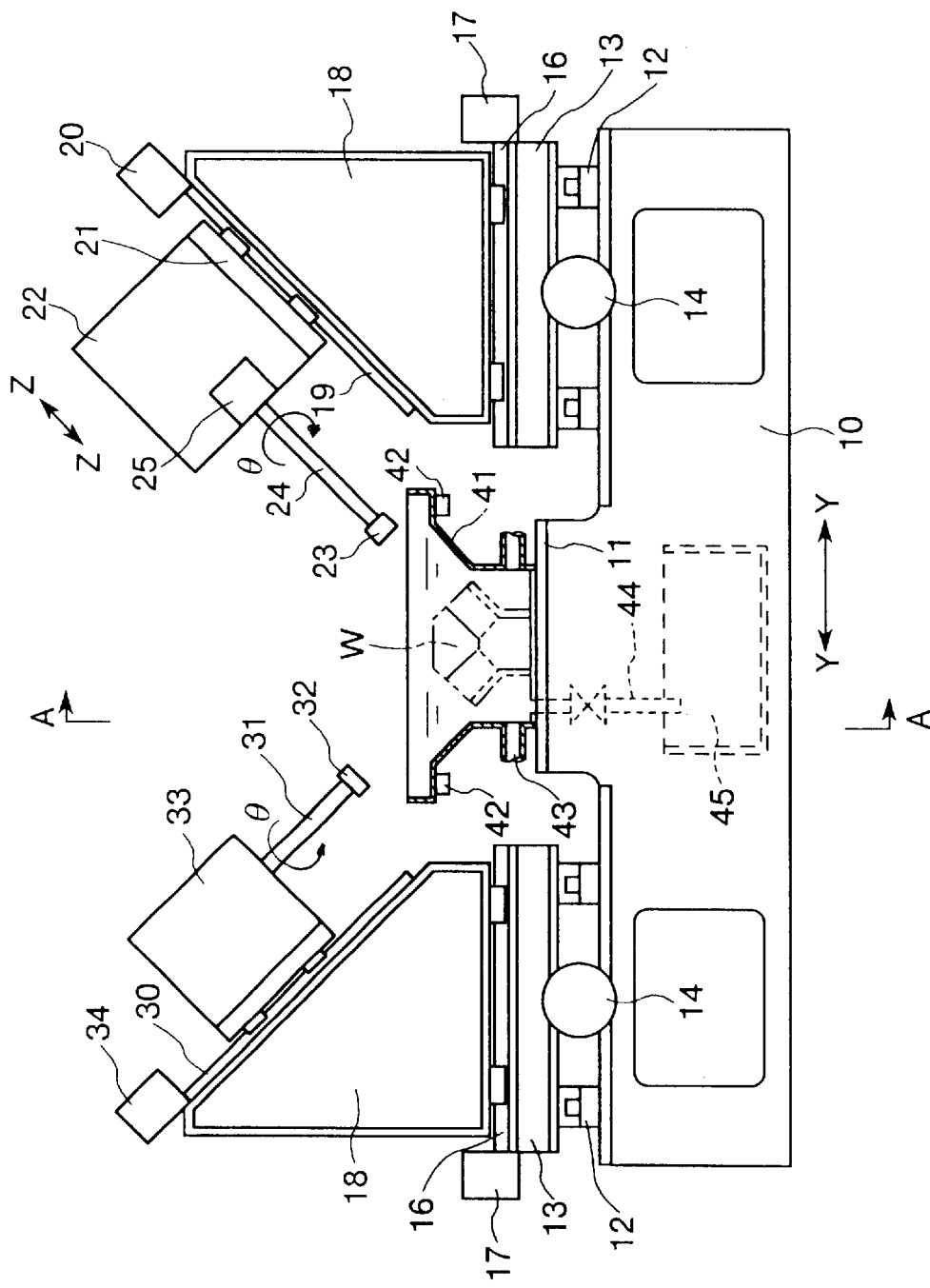
FIG. 1 is a front view of an embodiment of the induction-heating quenching apparatus of the present invention for quenching a workpieceg or V-type cylinder block.
Figure 2:
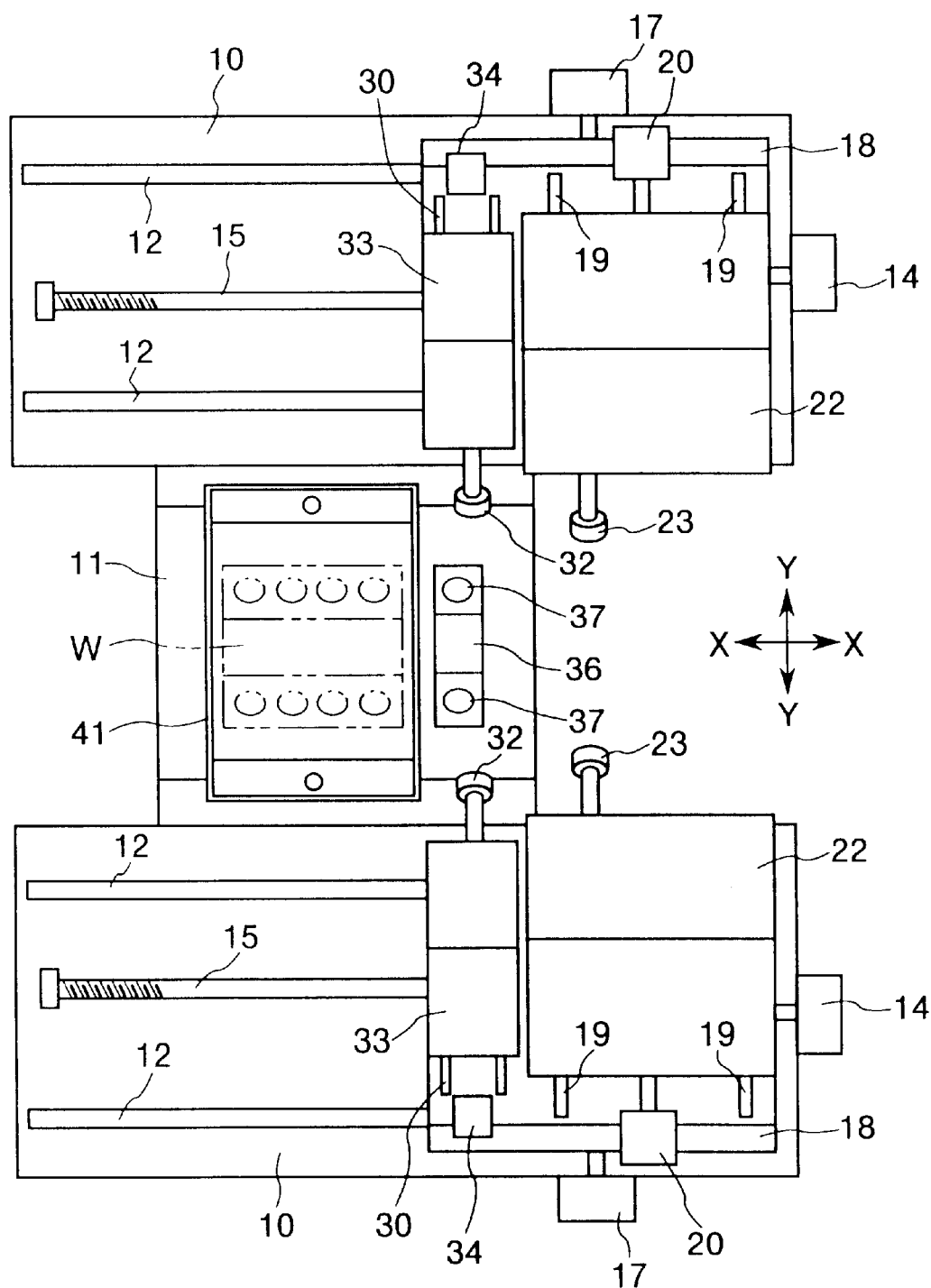
FIG. 2 is a plan view of the quenching apparatus of the present invention shown in FIG. 1.
Figure 3:
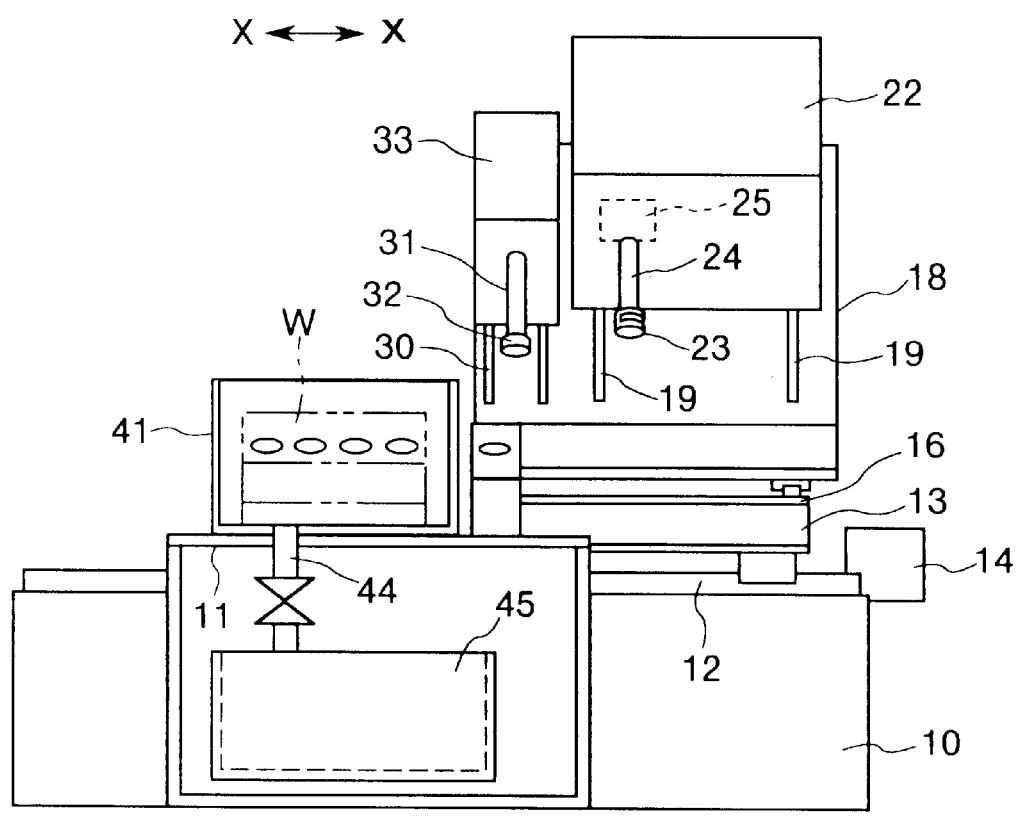
FIG. 3 is a longitudinal sectional view of the quenching apparatus of the present invention, taken along the line A—A of FIG. 1.

As shown in FIGS. 1 to 3, the quenching apparatus of the present invention is provided with a base frame 10. As is clear from FIG. 1, fixedly mounted on a substantially intermediate portion (in direction Y) of an upper surface of the base frame 10 is a work table 11. On this work table 11 a workpiece (hereinafter referred to as the work block) W is fixedly mounted in a manner such that the work block W has its rows of cylinder bores aligned with a direction X perpendicular to the plane of the paper of FIG. 1. Fixedly mounted on an upper surface of the work table 11 is a cooling tank 41 filled with a cooling liquid in which the work block W is immersed. The cooling liquid is supplied to the cooling tank 41 from a liquid supply pipe 43. After completion of a quenching process of the work block W, the cooling liquid which overflowed the brim portion of the cooling tank 41 is recovered through an overflow pipe 42, and returned to a cooling liquid reservoir 45 through a drain pipe 44. More specifically, the quenching operation of the work block W is performed in a manner such that: in a condition in which the work block W is immersed in the cooling liquid of the cooling tank 41, each of a plurality of induction heating coils 23 is inserted into the corresponding one of a plurality of cylinder bores of the work block W and energized to induction heat the corresponding cylinder bore; and, then the induction heating coils 23 are de-energized to permit the work block W to be quenched by the cooling liquid, whereby an inner surface of each of the cylinder bores of the work block W is quenched.

The work block W is provided with a reference hole (not shown) into which a knock pin (not shown) serving as a reference means is inserted to precisely position the work block W in a reference position on the work table 11. This knock pin (not shown) is provided in the bottom surface of the cooling tank 41. In the embodiment of the quenching apparatus of the present invention shown in FIG. 1, though there is no illustration, it is also possible to have the heated inner surface of each of the cylinder bores of the work block W quenched using a spray of the cooling liquid in a condition in which the work block W is immersed or not immersed in the cooling liquid of the cooling tank 41.

As shown in FIG. 2, a reference member 36 is fixedly mounted on the work table 11 in a position parallel to the cooling tank 41. This reference member 36 is provided with a pair of gauge rings 37 each of which is substantially identical in inner diameter with each of the cylinder bores of the work block W. Further, as is clear from FIG. 2, each of these gauge rings 37 is aligned with each of the rows of the cylinder bores of the work block W. As for a V-shaped angle defined between the two rows of the cylinder bores diverging from a common crankshaft space of the work block W, the gauge rings 37 make the same V-shaped angle with each other.

As is clear from FIG. 1, the work table 11 is disposed between opposite side portions of the base frame 10 which extends in the direction X. An X table 13 (shown in FIG. 1) travels on a pair of X rails 12 in each of the opposite side portions of the base frame 10. The X table 13 is combined with a Y table 18 and a Z table 21 (both of which will be described later in detail) to form a transfer table assembly for positioning the induction heating coils 23 relative to the work table 11. In each of the opposite side portions of the base frame 10, a pair of the X rails 12 extend in the direction X perpendicular to the plane of the paper of FIG. 1, are spaced apart from and parallel to each other and fixedly mounted on an upper surface of the base frame 10. The X table 13 is movably mounted on the X rails 12, and driven along the X rails 12 in a reciprocating manner in the direction X perpendicular to the plane of the paper of FIG. 2 by means of a suitable drive means such as a pulse motor 14 and a ball screw unit 15. A pair of Y rails 16, which are spaced apart from and parallel to each other, are fixedly mounted on an upper surface of the X table 13 to extend in the longitudinal direction Y which is perpendicular to the direction X. The above-mentioned Y table 18 is movably mounted on these Y rails 16, and driven in the direction Y in a reciprocating manner by means of a suitable drive unit 17 such as a pulse motor and the like, wherein the drive unit 17 is actuated upon receipt of a pulse signal issued from a control portion 101 shown in FIG. 4.

As shown in FIGS. 1 and 2, in each of the opposite side portions of the base frame 10, a pair of inclined rails 19 are provided in a manner such that the inclined rails 19 are spaced apart from and parallel to each other and fixedly mounted on an upper inclined surface of the Y table 18 to extend in a direction Z parallel to a longitudinal axis of each of the cylinder bores of the V-type work block W. Movably mounted on the inclined rails 19 is the Z table 21 which is driven in a reciprocating manner along the inclined rails 19 by means of a suitable drive unit 20. Fixedly mounted on the Z table 21 is a high-frequency transformer 22 a box of which is provided with at least one, preferably, a plurality of support shafts 24 for supporting the induction heating coils 23. This heating coil 23 is rotatably driven by a suitable drive unit 25 through its support shaft 24 to rotate in a direction θ (theta), as shown in FIG. 1. The induction heating coil 23 is of the same type as that disclosed in the previous invention made by the inventors of the present invention, which previous invention has matured into U.S. Pat. No. 6,024,913 entitled "PRECISION QUENCHING APPARATUS AND METHOD WITH INDUCTION HEATING", as described above.

In each of the opposite side portions of the base frame 10, further fixedly mounted on the upper inclined surface of the Y table 18 in parallel with the inclined rails 19 area pair of second inclined rails 30 which are spaced apart from and parallel to each other, as shown in FIG. 2. As is clear from FIG. 3, an inner-diameter measuring instrument 31 serving as a position determining means, is fixedly mounted on a measuring box 33. This box 33 is driven in a reciprocating manner along the second inclined rails 30 by means of a suitable drive unit 34 shown in FIG. 2. In this embodiment of the quenching apparatus of the present invention, the inner-diameter measuring instrument 31 is constructed of a contact-type electronic probe unit.

Figure 4:
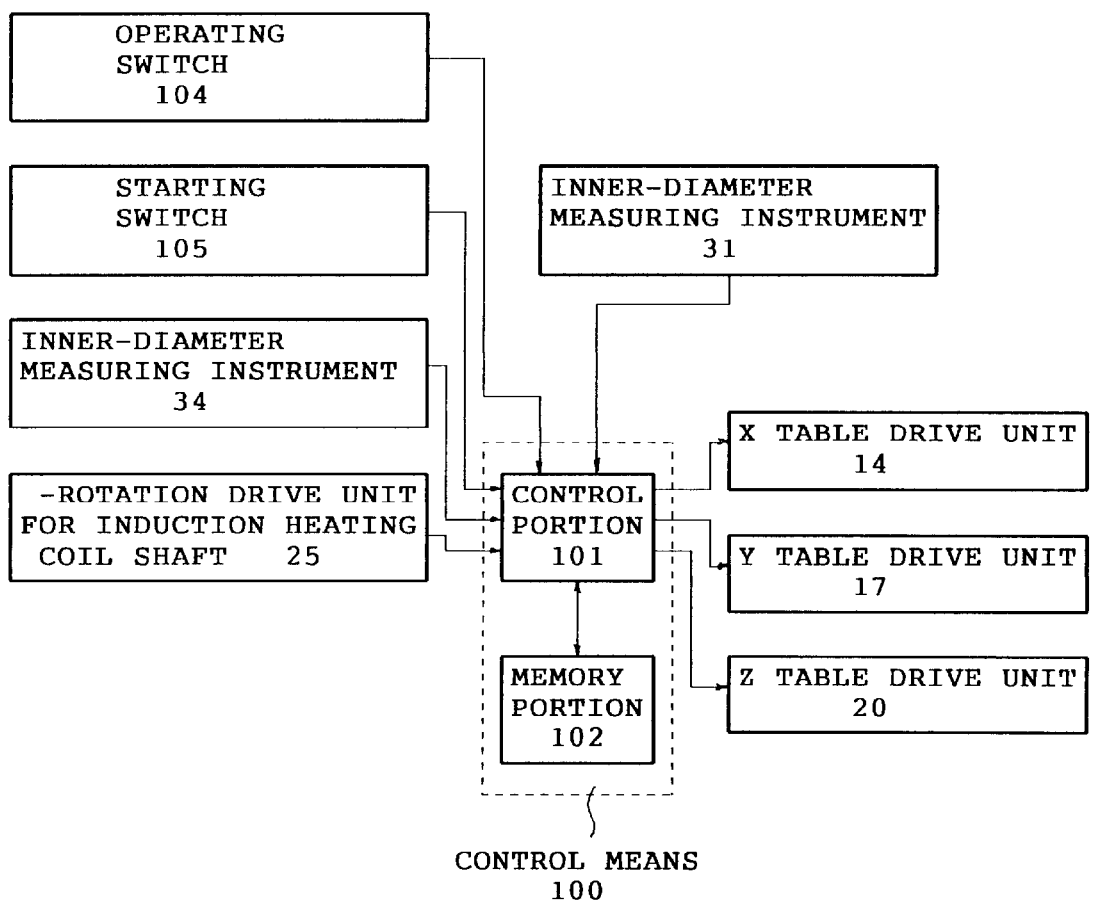
FIG. 4 is a schematic block diagram of the control means of the quenching apparatus of the present invention shown in FIG. 1.

As shown in FIG. 4, a control means 100 is constructed of the control portion 101 and a memory portion 102. This memory portion 102 stores therein: the coordinate of positions of the X table 13 and the Y table 18 in each of steps of a preparation stage of the quenching operation of the inner peripheral surface of each of the cylinder bores of the work block W, which steps will be described later; measured values of the coordinates of a position of each of the cylinder bores of the work block W in a quenching stage (described later) of the quenching operation; and, the coordinates of a position of each of the induction heating coils 23 in operation. On the other hand, on the basis of the coordinates stored in the memory portion 102, the control portion 101 of the control means 100 issues a plurality of pulse signals to the drive units 14, 17, 20, 25, 34 to actuate them. Upon receipt of the pulse signals, these drive unit 14, 17, 20, 25, 34 are actuated to drive each of the X table 13, Y table 18, Z table 21, inner-diameter measuring instrument 31 and the induction heating coils 23 in a predetermined mode during the preparation and the quenching stage in the quenching operation.

Now, the quenching operation of the V-type work block W performed in the quenching apparatus of the present invention will be described. In this embodiment, the cylinder bores of the work block W are spaced apart from and parallel to each other at predetermined intervals "A". In order to facilitate the description, only a single row of the cylinder bores of the work block W will be described as to their quenching operation. In the V-type work block W provided with two row of the cylinder bores, the following quenching operation will be simultaneously performed in these two rows of the cylinder bores.

Figure 5:
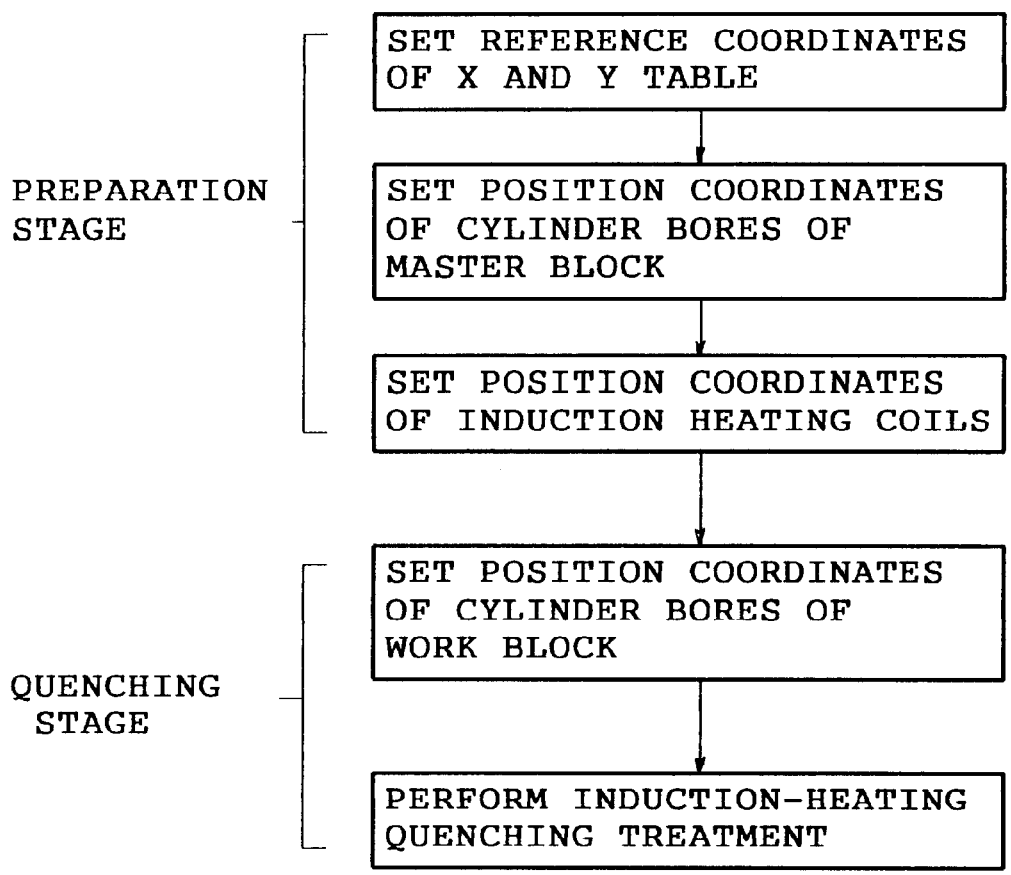
FIG. 5 is a flowchart of essential operations of the quenching apparatus of the present invention shown in FIG. 1.

As shown in FIG. 5, the quenching operation carried out by the quenching apparatus of the present invention comprises the preparation stage and the quenching stage. Set in position in the preparation stage in an X-Y coordinate system are: the origin of the coordinate system for determining the coordinates of positions of the X table 13 and the Y table 18; the coordinates of cylinder bores of a master block M; and, the coordinates of the induction heating coils 23. On the other hand, in the quenching stage, the coordinates of a position of each of the cylinder bores of the work block W are measured so that the quenching treatment with induction heating of the work block W is performed. These stages will be described in detail with reference to FIGS. 6 and 7.

Figure 6:
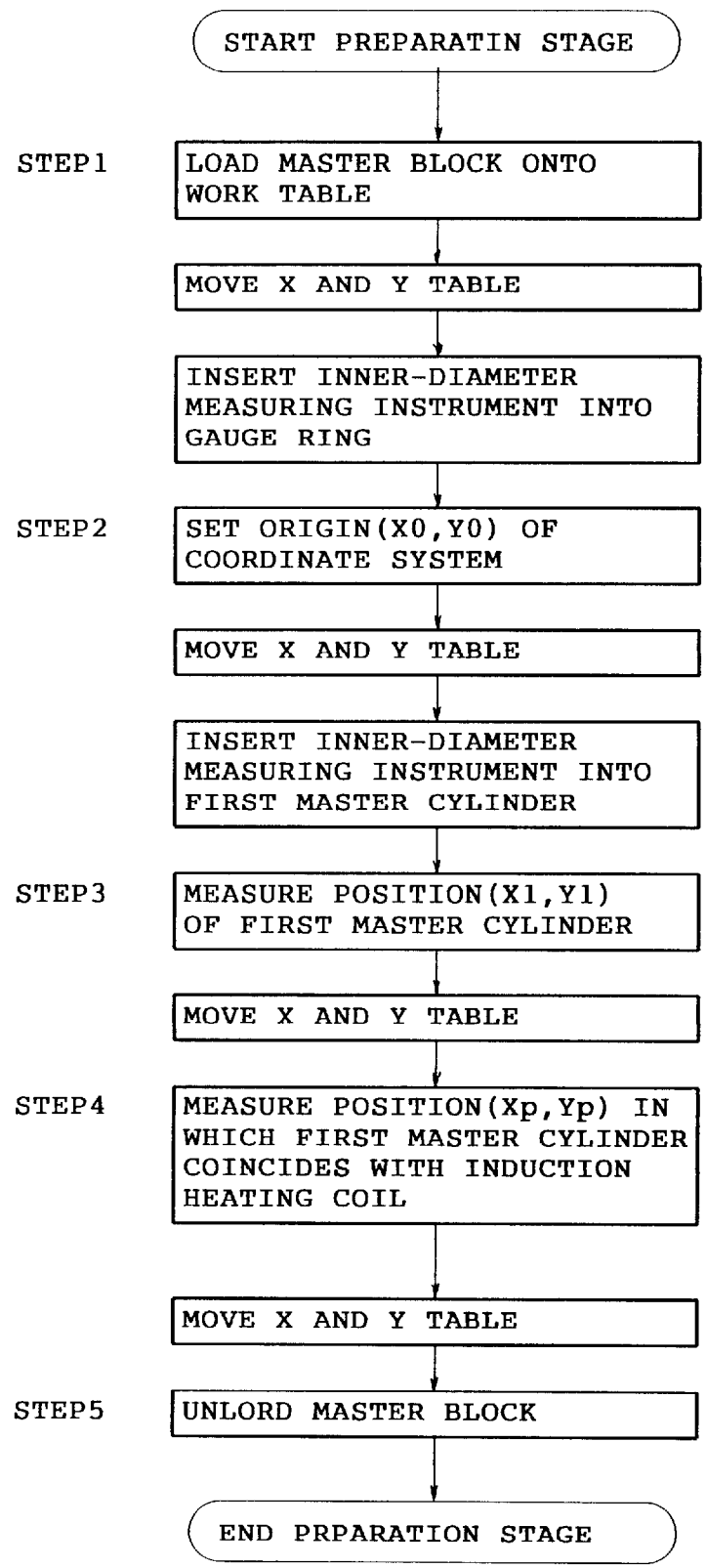
FIG. 6 is a flowchart of the preparation stages in the essential operations of the quenching apparatus of the present invention shown in FIG. 1.

FIG. 6 illustrates a flowchart, which comprises a plurality of steps 1 to 5 to be performed in the preparation stage (shown in FIG. 5) of the quenching operation with the induction heating according to the present invention.

In the step 1, the master block M, which is substantially identical in profile (i.e., in shape and dimensions) with the work block W, is fixedly mounted on the work table 11 in its preparation position in a manner such that each of two rows of the cylinder bores of the master block M is aligned with the direction X. The step 1 is followed by the subsequent step 2.

In the step 2: after a starting switch 105 shown in FIG. 4 is depressed, an operating switch 104 is operated to move both the X table 13 and the Y table 18 in a manner such that the inner-diameter measuring instrument 31 coincides with the gauge ring 37 in center, and is then driven downward along the inclined rails 30 by means of the drive unit 34 to have its inner-diameter measuring head portion 32 inserted into the gauge ring 37 of the reference member 36; and, the origin of this coordinate system is set at a point (Xo, Yo) (hereinafter, the numbers in parentheses denote the coordinates of the point or position). At this point (Xo, Yo), the inner-diameter measuring instrument 31 coincides with the gauge ring 37 in center. The step 2 is followed by the subsequent step 3.

In the step 3, the coordinates of the X table 13 and the Y table 18 at a position (X1, Y1) where a first cylinder bore M1 of the master block M coincides with the inner-diameter measuring instrument 31 in center are determined in a manner such that: first of all, both the X table 13 and the Y table 18 are so moved as to have the inner-diameter measuring instrument 31 coincide in center with the first cylinder bore M1 of the master block M in position; and, the head portion 32 of the inner-diameter measuring instrument 31 is inserted into the first cylinder bore M1 to detect a point (X1, Y1) where the first cylinder bore M1 coincides with the inner-diameter measuring instrument 31 in center. As a result, the coordinates of the remaining cylinder bores M2, M3, M4, , , Mn of the master block M will be defined as follows: the coordinates of the first cylinder bore M1: (X1, Y1); the coordinates of the second cylinder bore M2: ((X1+A), Y1); -----; and the coordinates of the n'th cylinder bore Mn: ((X1+(n−1)A), Y1)

The step 3 is followed by a subsequent step 4.

In the step 4, the coordinates of the induction heating coil 23 and those of the X table 13 and the Y table 18 are determined in a manner such that the X table 13 and the Y table 18 are moved to have the first cylinder bore M1 of the master block M coincide with the induction heating coil 23 in center at a point (Xp, Yp) which corresponds to the coordinates of the X table 13 and the Y table 18 in this case and is stored in the memory portion 102. Such a coincidence point (Xp, Yp) may be determined by measuring a clearance between an outer peripheral surface of the induction heating coil 23 and an inner peripheral surface of the first cylinder bore M1 of the master block M with the use of a pin gauge. It is also possible to determine such a coincidence point (Xp, Yp) using the reading of a dial gauge which is fixedly mounted on the support shaft 24 of the induction heating coil 23. After completion of the above step 4, a subsequent step 5 is performed.

In the step 5, the master block M is removed from the work table 11 so that the preparation stage in the quenching operation of the work block W with induction heating is completed. This preparation stage is essentially required only when the work block W is changed in shape and dimensions. In other words, in case that a plurality of the work blocks W which are substantially identical with each other in shape and dimensions are sequentially subjected to the quenching operation, no preparation stage is required for each of the second, third, , , and the n'th work block W in each of their quenching operations.

Now, the quenching stage of the quenching operation of the work block W will be described.

Figure 7:
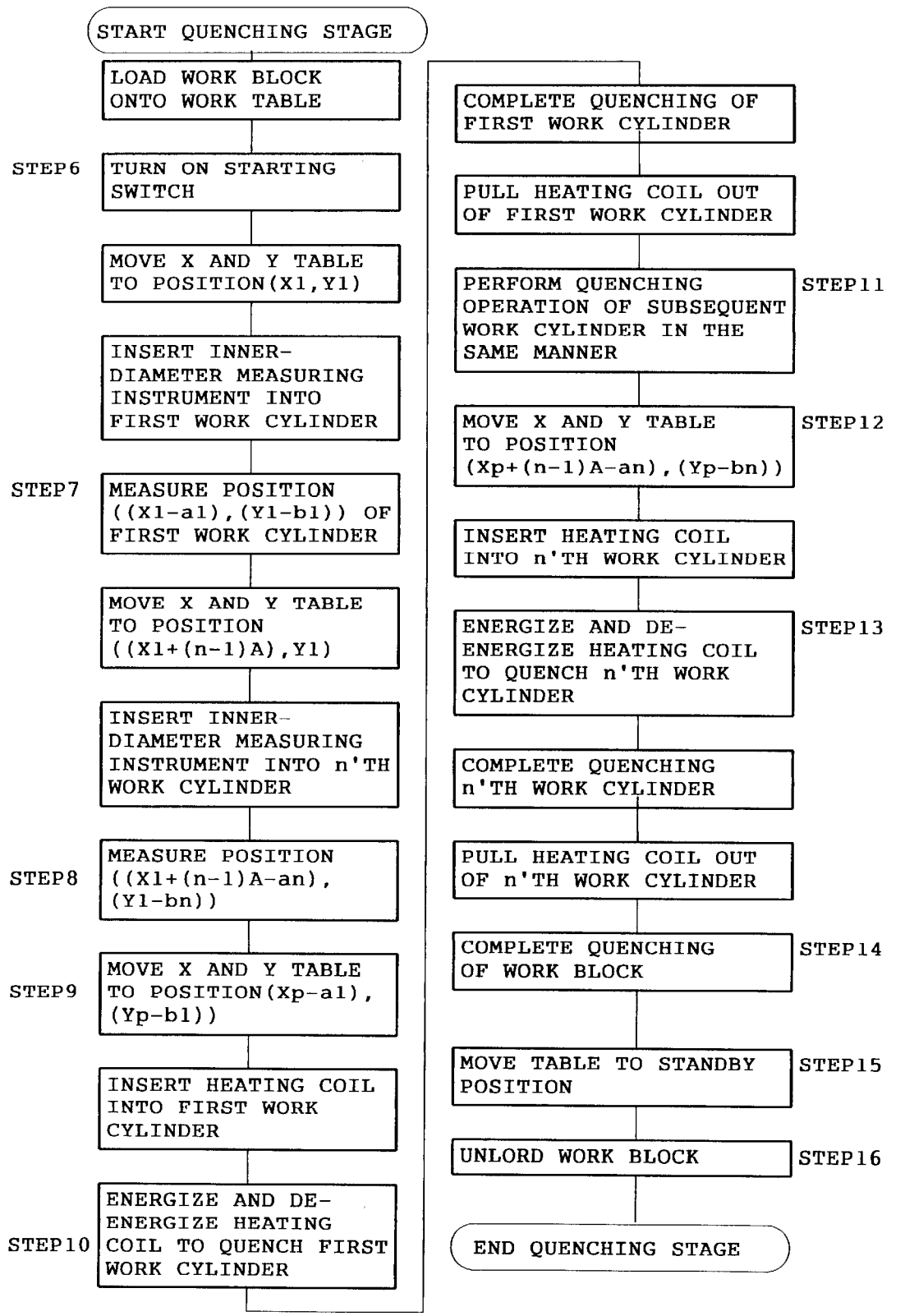
FIG. 7 is a flowchart of the quenching stages in the essential operations of the quenching apparatus of the present invention shown in FIG. 2.

FIG. 7 is a flowchart illustrating the quenching stage shown in FIG. 5. This quenching stage comprises a plurality of steps 6 to 16.

First, in the step 6, the work block W is mounted on the work table 11, and stationarily held in its reference position on the work table 11. Then, the starting switch 105 (shown in FIG. 4) for the quenching apparatus of the present invention is turned on. At this time, though each of the cylinder bores of the work block M assumes substantially the same position as that of each of the cylinder bores of the master block M, the coordinates of the work block W don't necessarily coincide with those of the master block M since there is a sight differences in each of exact setting position and machining accuracy between the work block W and the master block M. Consequently, with the use of the coordinates of each of the cylinder bores of the master block M as they are, it is not possible for the induction heating coil 23 to perform a precise quenching operation of the work block W. Due to this, in order to realize such a precise quenching operation of the work block W with the induction heating, it is necessary to determine a deviation in position of the work block W from the master block M. Now, a method of such a determination of the deviation will be described.

The drive units 14, 17 are actuated upon receipt of signals issued from both the control portion 101 and the memory portion 102 of the control means 100. As a result, the thus actuated drive units 14, 17 drive the X table 13 and the Y table 18 to a position of the coordinates (X1, Y1). After that, the drive unit 34 is actuated to drive and insert the head portion 32 of the inner-diameter measuring instrument 31 into the first cylinder bore W1 of the work block W, so that a deviation in center of the first cylinder bore W1 from the inner-diameter measuring instrument 31 is determined.

More specifically, in a step 7 subsequent to the above step 6, the coordinates ((X1+a1), (Y1+b1)) of the center of the first cylinder bore W1 in the work block W is determined by finding out 15 through measurement the deviation values "a1" and "b1" in the above coordinates ((X1+a1), (Y1+b1)) which deviate from the coordinates (X1, Y1) of the center of the first cylinder bore M1 of the master block M. The thus determined deviation values "a1" and "b1" in the coordinates ((X1+a1), (Y1+b1)) are stored in the memory portion 102 of the control means 100. After completion of the above measurement, the inner-diameter measuring instrument 31 is driven upward by the drive unit 34 according to a control signal issued from the control portion 101 of the control means 100, so that the inner-diameter measuring instrument 31 is pulled out of the first cylinder bore W1 of the work block W. Then, both the drive units 14, 17 are actuated to drive and move the X table 13 and the Y table 18 to a subsequent position corresponding to the coordinates ((X1+A), Y1) of the center of the second cylinder bore M2 in the master block M. In the same manner as that described above, the coordinates ((X1+A+a2), (Y1+b2)) of the center of the second cylinder bore W2 in the work block W is determined by finding out through measurement the deviation values "a2" and "b2" in the above coordinates ((X1+A+a2), (Y1+b2)) which deviate from the coordinates ((X1+A), Y1) of the center of the second cylinder bore M2 of the master block M. The thus determined deviation values "a2" and "b2" in the coordinates ((X1+A+a2), (Y1+b2)) are stored in the memory portion 102 of the control means 100. The same measurement procedure as that described above is repeated in each of the remaining cylinder bores up to the n'th cylinder bore Wn of the work block W in a step 8 subsequent to the above step 7. Namely, as for the n'th cylinder bore Wn of the work block W, the coordinates ((X1+(n−1)A+an), (Y1+bn)) of the center of the n'th cylinder bore Wn are stored in the memory portion 102 of the control means 100.

The step 8 is followed by a step 9. In this step 9, after completion of measurement of the position coordinates of each of the cylinder bores of the work block W, the quenching stage in the quenching operation starts. In this quenching stage of the work block W, the control portion 101 of the control means 100 issues a control signal to the drive units 14 and 17 which drive the X table 13 and the Y table 18, respectively, in a manner such that the center of the first cylinder bore W1 of the work block W is moved to a position of coordinates ((Xp−a1),(Yp−b1)) so as to compensate for the deviation values "a1" and "b1" in position of the first cylinder bore W1 the work block W. Such compensation makes it possible to have the induction heating coil 23 coincide in center with the first cylinder bore W1 of the work block W. In this position of the coordinates ((Xp−a1),(Yp−b1)), the drive unit 20 is actuated to drive the induction heating coil 23 downward into the first cylinder bore W1 so as to permit the coil 23 to reach a predetermined depth inside the first cylinder bore W1. After that, the step 9 is followed by a step 10.

In the step 10, as shown in the flowchart of FIG. 7, the induction heating coil 23 is energized to heat an inner surface of the first cylinder bore W1 of the work block W with induction heating. When the inner surface of the first cylinder bore W1 reaches a predetermined quenching temperature through induction heating, the induction heating coil 23 is de-energized to permit the first cylinder bore W1 of the work block W to be quenched with the cooling liquid circulating the cooling tank 41. After completion of this quenching stage of the first cylinder bore W1 of the work block W, the step 10 is followed by a step 11.

In the step 11, the drive unit 20 is actuated to pull the induction heating coil 23 out of the first cylinder bore W1 of the work block W. After that, the X table 13 and the Y table 18 are moved to a position of the coordinates ((Xp+A−a2), (Yp−b2)). Then, in the same manner as that described above, the quenching treatment of an inner surface of the second cylindrical bore W2 of the work block W is performed. The step 11 is followed by a series of steps 12 and 13.

In the steps 12 and 13, as for each of the remaining cylinder bores W3 to Wn of the work block W, the same quenching treatment as that described above is performed. Namely, as for the n'th cylinder bore Wn, the X table 13 and the Y table 18 are moved to a position of the coordinates ((Xp+(n−1)A−an), (Yp−bn)). Then, in the same manner as that described above, the quenching treatment of an inner surface of the n'th cylindrical bore Wn of the work block W is performed in the step 13.

In a step 14 subsequent to the step 13, the quenching stage of the quenching operation of work block W as to its cylinder bores W1 to Wn is completed. The step 14 is followed by a step 15.

In the step 15, the X table 13 and the Y table 18 are moved to their standby positions. All the above operations are automatically performed according to a series of controlling pulse signals issued from the control portion 101 of the control means 100 shown in FIG. 4. The step 15 is followed by a step 16.

In the step 16, the work block W thus quenched is dismounted from the work table 11 so that all the quenching operation of the work block W is completed.

The above quenching operation is simultaneously performed on the oppositely-arranged V-shaped rows of the cylinder bores W1 to Wn of the work block W. Due to this, it is possible for the quenching apparatus of the present invention provided with a pair of oppositely-arranged induction heating coils 23 to reduce a necessary quenching time of the work block W by more than 50% in comparison with that required in the conventional apparatus provided with a single induction heating coil.

Further, in the above quenching treatments of the inner surfaces of the cylinder bores W1 to Wn of the work block W, in case that a predetermined mottled pattern of individually quenched layers are formed in the inner surface of each of the cylinder bores W1 to Wn, it is possible to use an induction heating coil disclosed in the above-mentioned Japanese Patent Laid-Open No. Hei 7-161461. In other words, it is possible for the quenching apparatus of the present invention to produce such a predetermined mottled pattern of the quenched layers in the inner surface of each of the cylinder bores W1 to Wn by using the heating coil which is intermittently rotated on its axis by an angle θ (not shown) each time the quenched layer is formed.

In the above quenching operation, since the work block W is heated in the cooling tank 41 by induction heating, it is possible to quench the heated portion of the work block W immediately after the induction heating coil 23 is de-energized. The reason why the heated portion of the work block W is quenched is that the heated portion of the work block W is immediately subjected to the cooling liquid of the cooling tank 41. This enables the quenching apparatus of the present invention to efficiently produce the quenched layers excellent in hardness in the inner surface of each of the cylinder bores W1 to Wn of the work block W.

As described above, in the quenching apparatus of the present invention having the above construction, the quenching stage of the quenching operation performed by the apparatus is automatically conducted under computer control realized by the control portion 101 and the memory portion 102 of the control means 100. Consequently, it is possible for the quenching apparatus of the present invention to have each of the cylinder bores of the master and the work block precisely aligned in center with the induction heating coils 23. Due to this, it is possible for the quenching apparatus of the present invention to minimize a clearance between the inner surface of each of the cylinder bores W1 to wn and each of the induction heating coils 23, which ensures that the quenched layers of the mottled pattern are uniform in quality and suitable for mass-production.

Further, in the quenching apparatus of the present invention, since the opposite rows of the cylinder bores of the V-shaped or -type work block W are simultaneously quenched, it is possible to reduce a necessary quenching time of the work block W by more than 50% in comparison with the conventional apparatus provided with a single induction heating coil.

Figure 8:
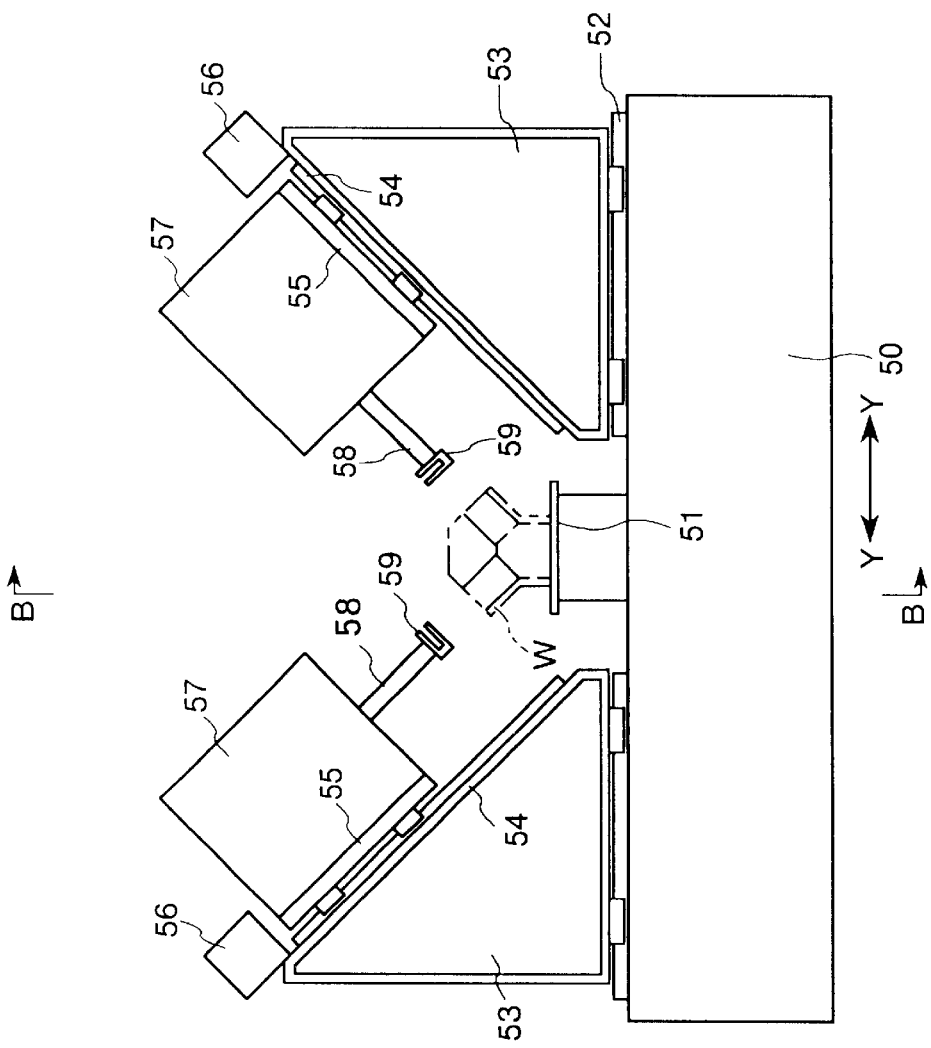
FIG. 8 is a front view of an induction-heating tempering apparatus of the present invention shown in FIG. 1, illustrating in phantom lines the V-type cylinder block mounted on the tempering apparatus.
Figure 9:
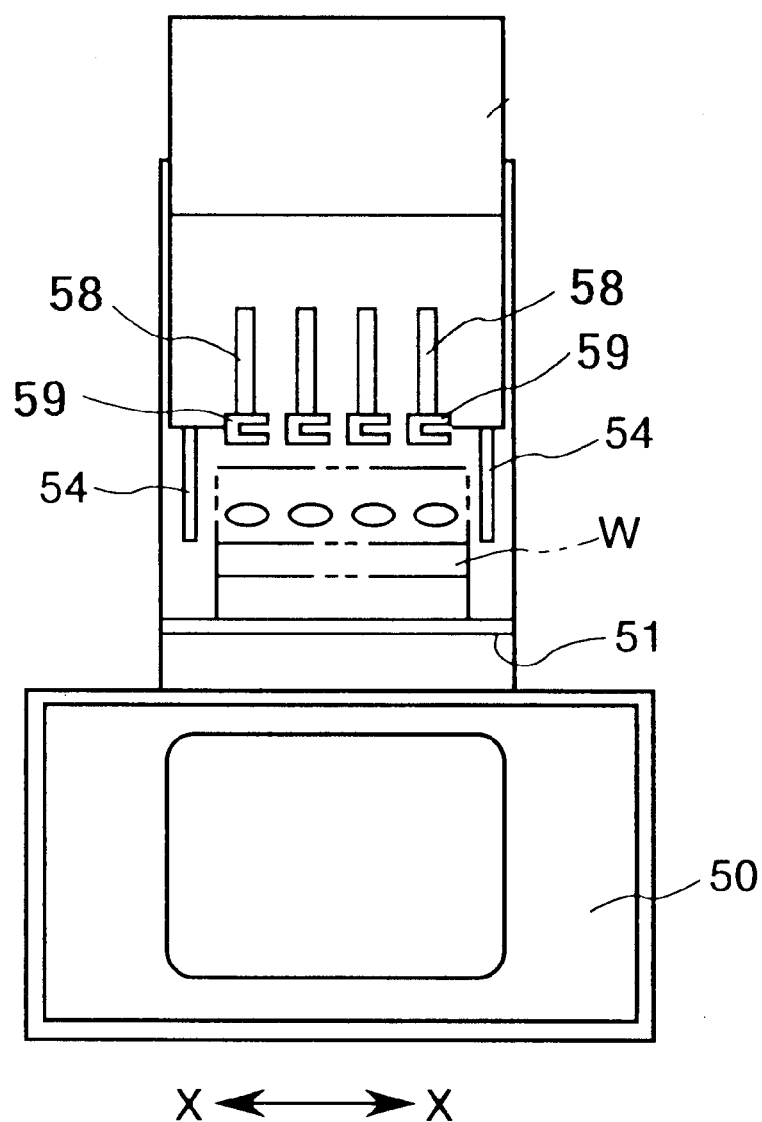
FIG. 9 is a longitudinal sectional view of the tempering apparatus of the present invention, taken along the line B—B of FIG. 8.

Now, a tempering operation of the work block W, which is performed on a work table 51 of an induction-heating tempering apparatus of the present invention to follow the above quenching operation performed on the work table 11 of the induction-heating quenching apparatus of the present invention, will be described with reference to FIGS. 8 and 9. FIG. 8 shows a front view of the tempering apparatus of the present invention. FIG. 9 shows a longitudinal sectional view of the tempering apparatus, taken along the line B—B of FIG. 8.

In these drawings, as shown in FIG. 8, the work table 51 is fixedly mounted on a substantially intermediate portion (in direction Y) of a base frame 50 of the tempering apparatus in a manner such that the work block W has its rows of cylinder bores aligned with the direction X shown in FIG. 9, wherein the direction X is perpendicular to the plane of the paper of FIG. 8. As shown reel in FIG. 9, movably mounted on each of opposite sides of an upper surface of the base frame 50 through a pair of Y rails 52 spaced apart from and parallel each other is each of a pair of Y tables 53 which are capable of moving along the rails 52 in the direction Y. The pair of Y rails 52 are fixedly mounted on the upper surface of the base frame 50.

As shown in FIGS. 8 and 9, a pair of rails 54, which are spaced apart from and parallel to each other, are fixedly mounted on an upper inclined surface of each of the Y tables 53 to extend in parallel with a longitudinal axis of each of the cylinder bores of the work block W fixedly mounted on the work table 51. On the other hand, a Z table 55 is movably mounted on the inclined surface of the Y table 53 through the Y rails 54 and driven by a drive unit 56 to move in a reciprocating manner along the inclined surface of the Y table 53. Fixedly mounted on the z table 55 is a high-frequency transformer 57 a box of which is provided with a plurality of support shafts 58. Each of these support shafts 58 supports an induction heating coil 59. These heating coils 59 coincide with the cylinder bores of the work block W in number and in spacing. In this embodiment shown in FIGS. 8 and 9, since the work block W is a V-type cylinder block provided with eight cylinder bores, the number of the induction heating coils 59 is eight so that each of the high-frequency transformers 57 is provided with four induction heating coils 59 as shown in FIG. 9. In case that the work block W is provided with six cylinder bores, each of the high-frequency transformers 57 is provided with three induction heating coils 59. In the case of the work block W provided with a dozen cylinder bores, each of the high-frequency transformers 57 is provided with six induction heating coils 59. Further, in the case of the work block W provided with eight cylinder bores, it is possible for each of the high-frequency transformers 57 to have only a pair of induction heating coils 59, provided that the tempering operation of the work block W is performed twice using these high-frequency transformers 57 in order to have all the eight cylinder bores of the work block W subjected to the tempering operation.

Now, the induction-heating tempering apparatus of the present invention having the above construction will be described in operation.

First, the master block M is fixedly mounted on the work table 51 in a reference position thereon. Then, each of the induction heating coils 59 is subsequently inserted into each of the corresponding cylinder bores of the master block M, which is adjusted in position in a manner such that each of the induction heating coils 59 coincides in center with each of the corresponding cylinder bores of the master block M, and finally fixed in position to each of the high-frequency transformers 57. After completion of such positioning operation of the induction heating coils 59 of the high-frequency transformers 57 with respect to the master block M, the Y tables 53 are fixed. Then, all the induction heating coils 59 are pulled by the drive units 56 up to their standby positions.

Next, the master block M is replaced with the work block W in the reference position on the work table 51. Then, the drive units 56 are actuated to drive the Z tables 55 in a manner such that the induction heating coils 59 are precisely inserted into the corresponding cylinder bores of the work block W, whereby all the induction heating coils 59 thus inserted into the work block W substantially coincide in center with all the corresponding cylinder bores of the work block W. In the case of the tempering operation, accuracy required in positioning of the induction heating coils 59 within the cylinder bores of the work block W is relatively mild in comparison with the quenching operation. Due to this, it is possible for the tempering apparatus of the present invention to perform the tempering operation of the work block W immediately after the induction heating coils 59 are inserted into the cylinder bores of the work block W. Through such tempering operation, a predetermined temper hardness is obtained in the inner surface of each of the cylinder bores of the work block W at the same time. This considerably reduces a tempering time required in the conventional tempering apparatus in which the cylinder bores of the work block W are individually tempered and therefore poor in productivity. In other words, the tempering apparatus of the present invention is considerably improved in productivity in comparison with the conventional tempering apparatus.

The heat-treatment apparatus of the present invention is constructed of the above quenching apparatus and the tempering apparatus, and therefore excellent in productivity.

As described above, the induction-heating quenching apparatus of the present invention for quenching the work block W (i.e., V-type cylinder block) is capable of quenching both the opposite rows of the cylinder bores of the V-type cylinder block at the same time in a condition in which the work block W is fixedly mounted on the work table 11. Due to this, it is possible for the quenching apparatus of the present invention to reduce the quenching time required in the conventional quenching apparatus by more than 50%, provided that: in the conventional quenching apparatus, the work block is of an in-line type and has its cylinder bores individually subjected to the quenching operation while traveling. Further, the quenching apparatus of the present invention is capable of considerably saving space and manufacturing cost due to its simple construction in comparison with the conventional quenching apparatus. As for the tempering apparatus of the present invention for tempering the V-type cylinder block (i.e., work block W), it is possible for the tempering apparatus of the present invention to temper a plurality of the cylinder bores of the work block W at the same time. Due to this, the tempering apparatus of the present invention is excellent in working efficiency. Further, by combining this quenching apparatus with the tempering apparatus according to the present invention, it is possible to remarkably improve the heat-treatment apparatus of the present invention in productivity.

While the present invention has been particularly shown and described with reference to the preferred embodiments thereof, it will be understood by those skilled in the art that various modifications and changes may be made therein without departing from the spirit of the present invention as defined by the appended claims.

What is claimed is:

1. A heat-treatment apparatus for quenching a V-type cylinder block (W) by induction heating, comprising:
   a work table (11) on which said cylinder block (W) is fixedly mounted in a reference position thereon, wherein said work table (11) is fixedly mounted on a base frame (10);
   a plurality of induction heating coils (23) each for heating an inner surface of each of a plurality of cylinder bores (wn) of said cylinder block (W); and
   a transfer table assembly (13, 18, 21) for supporting said heating coils (23) in a manner such that each of said heating coils (23) is movable in a reciprocating manner in parallel with a longitudinal axis of each of said cylinder bores (Wn) to enter and exit from each of said cylinder bores (Wn) and also movable in a direction in parallel with each of rows of said cylinder bores (Wn) in a reciprocating manner; wherein said transfer table assembly (13, 18, 21) is movably mounted on each of opposite sides of said base frame (10) to sandwich said work table (11) therebetween.

2. The heat-treatment apparatus for quenching the V-type cylinder block (W) by induction heating as set forth in claim 1, wherein said transfer table assembly (13, 18, 21) is constructed of:
   an X table (13) which travels in a direction X in parallel with said rows of said cylinder bores (Wn) along an upper surface of said base frame (10);
   a Y table (18) movably mounted on said X table (13), wherein said Y table (18) travels in a direction Y perpendicular to said direction X along said upper surface of said base frame (10); and
   a Z table (21) movably mounted on said Y table (18), wherein said Z table (21) supports said induction heating coils (23) to travel in a direction (Z) along an upper inclined surface of said Y table (18), wherein said upper inclined surface of said Y table (18) extends in parallel with said longitudinal axis of each of said cylinder bores (Wn).

3. The heat-treatment apparatus for quenching the V-type cylinder block (W) by induction heating as set forth in claim 2, wherein:
   said work table (11) is provided with a reference member (36) for determining a position of each of said cylinder bores (Wn) of said cylinder block (W) in a coordinate system;
   said Y table (18) is provided with a position determining means (31) for determining the coordinates of each of said reference member (36) and said cylinder bores (Wn) of said cylinder block (W); and a control means (100) is provided to control in position said transfer table assembly (13, 18, 21) on the basis of said coordinates of each of said reference member (36) and said cylinder bores (Wn) in a manner such that said induction heating coils (23) are capable of entering and exiting from said cylinder bores (Wn) of said cylinder block (W).

4. The heat-treatment apparatus for quenching the V-type cylinder block (W) by induction heating as set forth in claim 3, wherein said position determining means (31) is movably mounted on said Y table (18) in a manner such that said position determining means (31) is movable in parallel with a longitudinal axis of each of said cylinder bores (Wn) of said cylinder block (W) along said upper inclined surface of said Y table (18).

5. The heat-treatment apparatus for quenching the V-type cylinder block (W) by induction heating as set forth in claim 3, wherein:

each of said induction heating coils (23) is supported on said Z table (21) so as to be rotatable in a direction (θ); and said control means (100) is provided with a control portion (101) for controlling each of said induction heating coils (23) in its rotational motion.

6. The heat-treatment apparatus for quenching the V-type cylinder block (W) by induction heating as set forth in claim 3, wherein:

said reference member (36) assumes substantially the same V-type shape as that of said cylinder block (W) in cross section, and is provided with a pair of gauge rings (37) each of which is identical in inner diameter with each of said cylinder bores (Wn) of said cylinder block (W); and said position determining means (31) is provided with an inner-diameter measuring head portion (32), and constructed of an inner-diameter measuring instrument for determining a clearance between an inner diameter of said gauge ring (37) and an outer diameter of said inner-diameter measuring head portion (32) of said position determining means (31).

7. The heat-treatment apparatus for quenching the V-type cylinder block (W) by induction heating as set forth in claim 3, wherein:

a cooling tank (41) is fixedly mounted on an upper surface of said work table (11) and filled with a cooling liquid in which said cylinder block (W) is immersed, heated by induction heating and quenched by said cooling liquid upon de-energizing of said induction heating coils (23).

8. The heat-treatment apparatus for quenching the V-type cylinder block (W) by induction heating as set forth in claim 3, wherein: said cylinder block (W) has said cylinder bores spaced apart from and parallel to each other at predetermined intervals (A); and, a control means (100) for realizing quenching operation of said cylinder block (W) is provided in said apparatus, said quenching operation comprising the steps of:

1) set a master block (M) at a reference position on said work table (11) in a manner such that said master block (M) has each of rows of its cylinder bores (Mn) aligned with said direction X, wherein said master block (M) is substantially identical in shape and dimensions with said cylinder block (W);

2) move said X table (13) and said Y table (18) to a position in which said position determining means (31) mounted on said Y table (18) coincides in center with said reference member (36) mounted on said work table (11), wherein coordinates (Xo, Yo) of said position are measured;

3) move said X table (13) and said Y table (18) to a first position in which said position determining means (31) coincides in center with a first one (M1) of said cylinder bores (Mn) of said master block (M), wherein coordinates (X1, Y1) of said first position are measured;

4) calculate coordinates (X1+(n−1)A, Y1) of a new position of said X table (13) and said Y table (18) on the basis of said coordinates (X1, Y1) of said first position, in which new position said position determining means (31) coincides in center with an n'th one (Mn) of cylinder bores of said master block (M), wherein said cylinder bores of said master block (M) are spaced apart from and parallel to each other at predetermined intervals (A);

5) move said X table (13) and said Y table (18) to a "p" position in which said first cylinder bore (M1) coincides in center with said induction heating coil (23), wherein coordinates (Xp, Yp) of said "p" position are measured;

6) store all said coordinates defined above in said control means (100);

7) replace said master block (M) with said cylinder block (W) in said reference position on said work table (11);

8) move said X table (13) and said Y table (18) to a position in which each of said cylinder bores (Wn) of said cylinder block (w) coincides in center with each of said induction heating coils (23), wherein coordinates ((X1+(n−1)A+an), (Y1+bn)) of said position are measured;

9) move said X table (13) and said Y table (18) to a position of coordinates ((Xp+(n−1)A−an), (Yp−bn)) in which an inner surface of an n'th one of said cylinder bores (Wn) of said cylinder block (W) is subsequently subjected to an induction heating and a quenching operation, wherein said "an" and said "bn" are deviation values deviated from set values;

10) quench both said rows of cylinder bores (wn) of said Y-type cylinder block (W) in the same manner as that described above.

9. A heat-treatment apparatus for tempering a V-type cylinder block (W) by induction heating, comprising:

a work table (51) on which said cylinder block (W) is fixedly mounted in a reference position thereon, wherein said work table (51) is fixedly mounted on a base frame (50);

a plurality of induction heating coils (59) for heating an inner surface of each of a plurality of cylinder bores (wn) of said cylinder block (W); and a transfer table assembly (53, 55) for supporting said heating coils (59) in a manner such that each of said heating coils (59) is movable in a reciprocating manner in parallel with a longitudinal axis of each of said cylinder bores (Wn) to enter and exit from each of said cylinder cores (Wn); wherein said transfer table assembly (53, 55) is movably mounted on each of opposite sides of said base frame (50) to sandwich said work table (51) therebetween.

10. The heat-treatment apparatus for quenching the V-type cylinder block (W) by induction heating as set forth in claim 4, wherein:

each of said induction heating coils (23) is supported on said Z table (21) so as to be rotatable in a direction (θ); and said control means (100) is provided with a control portion (101) for controlling each of said induction heating coils (23) in its rotational motion.

11. The heat-treatment apparatus for quenching the V-type cylinder block (W) by induction heating as set forth in claim 4, wherein:

said reference member (36) assumes substantially the same V-type shape as that of said cylinder block (W) in cross section, and is provided with a pair of gauge rings (37) each of which is identical in inner diameter with each of said cylinder bores (Wn) of said cylinder block (W); and said position determining means (31) is provided with an inner-diameter measuring head portion (32), and constructed of an inner-diameter measuring instrument for determining a clearance between an inner diameter of said gauge ring (37) and an outer diameter of said inner-diameter measuring head portion (32) of said position determining means (31).

12. The heat-treatment apparatus for quenching the V-type cylinder block (W) by induction heating as set forth in claim 5, wherein:

said reference member (36) assumes substantially the same V-type shape as that of said cylinder block (W) in cross section, and is provided with a pair of gauge rings (37) each of which is identical in inner diameter with each of said cylinder bores (Wn) of said cylinder block (W); and said position determining means (31) is provided with an inner-diameter measuring head portion (32), and constructed of an inner-diameter measuring instrument for determining a clearance between an inner diameter of said gauge ring (37) and an outer diameter of said inner-diameter measuring head portion (32) of said position determining means (31).

13. The heat-treatment apparatus for quenching the V-type cylinder block (W) by induction heating as set forth in claim 4, wherein:

a cooling tank (41) is fixedly mounted on an upper surface of said work table (11) and filled with a cooling liquid in which said cylinder block (W) is immersed, heated by induction heating and quenched by said cooling liquid upon de-energizing of said induction heating coils (23).

14. The heat-treatment apparatus for quenching the V-type cylinder block (W) by induction heating as set forth in claim 5, wherein:

a cooling tank (41) is fixedly mounted on an upper surface of said work table (11) and filled with a cooling liquid in which said cylinder block (W) is immersed, heated by induction heating and quenched by said cooling liquid upon de-energizing of said induction heating coils (23).

15. The heat-treatment apparatus for quenching the V-type cylinder block (W) by induction heating as set forth in claim 6, wherein:

a cooling tank (41) is fixedly mounted on an upper surface of said work table (11) and filled with a cooling liquid in which said cylinder block (W) is immersed, heated by induction heating and quenched by said cooling liquid upon de-energizing of said induction heating coils (23).

16. The heat-treatment apparatus for quenching the V-type cylinder block (W) by induction heating as set forth in claim 4, wherein: said cylinder block (W) has said cylinder bores spaced apart from and parallel to each other at predetermined intervals (A); and, a control means (100) for realizing quenching operation of said cylinder block (W) is provided in said apparatus, said quenching operation comprising the steps of:

1) set a master block (M) at a reference position on said work table (11) in a manner such that said master block (M) has each of rows of its cylinder bores (Mn) aligned with said direction X, wherein said master block (M) is substantially identical in shape and dimensions with said cylinder block (W);

2) move said X table (13) and said Y table (18) to a position in which said position determining means (31) mounted on said Y table (18) coincides in center with said reference member (36) mounted on said work table (11), wherein coordinates(Xo, Yo) of said position are measured;

3) move said X table (13) and said Y table (18) to a first position in which said position determining means (31) coincides in center with a first one (M1) of said cylinder bores (Mn) of said master block (M), wherein coordinates (X1, Y1) of said first position are measured;

4) calculate coordinates (X1+(n−1)A, Y1) of a new position of said X table (13) and said Y table (18) on the basis of said coordinates (X1, Y1) of said first position, in which new position said position determining means (31) coincides in center with an n'th one (Mn) of said cylinder bores of said master block (M), wherein said cylinder bores of said master block (M) are spaced apart from and parallel to each other at predetermined intervals (A);

5) move said X table (13) and said Y table (18) to a "p" position in which said first cylinder bore (M1) coincides in center with said induction heating coil (23), wherein coordinates (Xp, Yp) of said "p" position are measured;

6) store all said coordinates defined above in said control means (100);

7) replace said master block (M) with said cylinder block (W) in said reference position on said work table (11);

8) move said X table (13) and said Y table (18) to a position in which each of said cylinder bores (Wn) of said cylinder block (w) coincides in center with each of said induction heating coils (23), wherein coordinates ((X1+(n−1)A+an), (Y1+bn)) of said position are measured;

9) move said X table (13) and said Y table (18) to a position of coordinates ((Xp+(n−1)A−an), (Yp−bn)) in which an inner surface of an n'th one of said cylinder bores (Wn) of said cylinder block (W) is subsequently subjected to an induction heating and a quenching operation, wherein said "an" and said "bn" are deviation values deviated from set values;

10) quench both said rows of cylinder bores (wn) of said Y-type cylinder block (W) in the same manner as that described above.

17. The heat-treatment apparatus for quenching the V-type cylinder block (W) by induction heating as set forth in claim 5, wherein: said cylinder block (W) has said cylinder bores spaced apart from and parallel to each other at predetermined intervals (A); and, a control means (100) for realizing quenching operation of said cylinder block (W) is provided in said apparatus, said quenching operation comprising the steps of:

1) set a master block (M) at a reference position on said work table (11) in a manner such that said master block (M) has each of rows of its cylinder bores (Mn) aligned with said direction X, wherein said master block (M) is substantially identical in shape and dimensions with said cylinder block (W);

2) move said X table (13) and said Y table (18) to a position in which said position determining means (31) mounted on said Y table (18) coincides in center with said reference member (36) mounted on said work table (11), wherein coordinates(Xo, Yo) of said position are measured;

3) move said X table (13) and said Y table (18) to a first position in which said position determining means (31) coincides in center with a first one (M1) of said cylinder bores (Mn) of said master block (M), wherein coordinates (X1, Y1) of said first position are measured;

4) calculate coordinates (X1+(n−1)A, Y1) of a new position of said X table (13) and said Y table (18) on the basis of said coordinates (X1, Y1) of said first position, in which new position said position determining means (31) coincides in center with an n'th one (Mn) of said cylinder bores of said master block (M), wherein said cylinder bores of said master block (M) are spaced apart from and parallel to each other at predetermined intervals (A);

5) move said X table (13) and said Y table (18) to a "p" position in which said first cylinder bore (M1) coincides in center with said induction heating coil (23), wherein coordinates (Xp, Yp) of said "p" position are measured;

6) store all said coordinates defined above in said control means (100);

7) replace said master block (M) with said cylinder block (W) in said reference position on said work table (11);

8) move said X table (13) and said Y table (18) to a position in which each of said cylinder bores (Wn) of said cylinder block (w) coincides in center with each of said induction heating coils (23), wherein coordinates ((X1+(n−1)A+an), (Y1+bn)) of said position are measured;

9) move said X table (13) and said Y table (18) to a position of coordinates ((Xp+(n−1)A−an), (Yp−bn)) in which an inner surface of an n'th one of said cylinder bores (Wn) of said cylinder block (W) is subsequently subjected to an induction heating and a quenching operation, wherein said "an" and said "bn" are deviation values deviated from set values;

10) quench both said rows of cylinder bores (wn) of said Y-type cylinder block (W) in the same manner as that described above.

18. The heat-treatment apparatus for quenching the V-type cylinder block (W) by induction heating as set forth in claim 6, wherein: said cylinder block (W) has said cylinder bores spaced apart from and parallel to each other at predetermined intervals (A); and, a control means (100) for realizing quenching operation of said cylinder block (W) is provided in said apparatus, said quenching operation comprising the steps of:

1) set a master block (M) at a reference position on said work table (11) in a manner such that said master block (M) has each of rows of its cylinder bores (Mn) aligned with said direction X, wherein said master block (M) is substantially identical in shape and dimensions with said cylinder block (W);

2) move said X table (13) and said Y table (18) to a position in which said position determining means (31) mounted on said Y table (18) coincides in center with said reference member (36) mounted on said work table (11), wherein coordinates(Xo, Yo) of said position are measured;

3) move said X table (13) and said Y table (18) to a first position in which said position determining means (31) coincides in center with a first one (M1) of said cylinder bores (Mn) of said master block (M), wherein coordinates (X1, Y1) of said first position are measured;

4) calculate coordinates (X1+(n−1)A, Y1) of a new position of said X table (13) and said Y table (18) on the basis of said coordinates (X1, Y1) of said first position, in which new position said position determining means (31) coincides in center with an n'th one (Mn) of said cylinder bores of said master block (M), wherein said cylinder bores of said master block (M) are spaced apart from and parallel to each other at predetermined intervals (A);

5) move said X table (13) and said Y table (18) to a "p" position in which said first cylinder bore (M1) coincides in center with said induction heating coil (23), wherein coordinates (Xp, Yp) of said "p" position are measured;

6) store all said coordinates defined above in said control means (100);

7) replace said master block (M) with said cylinder block (W) in said reference position on said work table (11);

8) move said X table (13) and said Y table (18) to a position in which each of said cylinder bores (Wn) of said cylinder block (w) coincides in center with each of said induction heating coils (23), wherein coordinates ((X1+(n−1)A+an), (Y1+bn)) of said position are measured;

9) move said X table (13) and said Y table (18) to a position of coordinates ((Xp+(n−1)A−an), (Yp−bn)) in which an inner surface of an n'th one of said cylinder bores (Wn) of said cylinder block (W) is subsequently subjected to an induction heating and a quenching operation, wherein said "an" and said "bn" are deviation values deviated from set values;

10) quench both said rows of cylinder bores (wn) of said Y-type cylinder block (W) in the same manner as that described above.

19. The heat-treatment apparatus for quenching the V-type cylinder block (W) by induction heating as set forth in claim 7, wherein: said cylinder block (W) has said cylinder bores spaced apart from and parallel to each other at predetermined intervals (A); and, a control means (100) for realizing quenching operation of said cylinder block (W) is provided in said apparatus, said quenching operation comprising the steps of:

1) set a master block (M) at a reference position on said work table (11) in a manner such that said master block (M) has each of rows of its cylinder bores (Mn) aligned with said direction X, wherein said master block (M) is substantially identical in shape and dimensions with said cylinder block (W);

2) move said X table (13) and said Y table (18) to a position in which said position determining means (31) mounted on said Y table (18) coincides in center with said reference member (36) mounted on said work table (11), wherein coordinates(Xo, Yo) of said position are measured;

3) move said X table (13) and said Y table (18) to a first position in which said position determining means (31)

coincides in center with a first one (M1) of said cylinder bores (Mn) of said master block (M), wherein coordinates (X1, Y1) of said first position are measured;

4) calculate coordinates (X1+(n−1)A, Y1) of a new position of said X table (13) and said Y table (18) on the basis of said coordinates (X1, Y1) of said first position, in which new position said position determining means (31) coincides in center with an n'th one (Mn) of said cylinder bores of said master block (M), wherein said cylinder bores of said master block (M) are spaced apart from and parallel to each other at predetermined intervals (A);

5) move said X table (13) and said Y table (18) to a "p" position in which said first cylinder bore (M1) coincides in center with said induction heating coil (23), wherein coordinates (Xp, Yp) of said "p" position are measured;

6) store all said coordinates defined above in said control means (100);

7) replace said master block (M) with said cylinder block (W) in said reference position on said work table (11);

8) move said X table (13) and said Y table (18) to a position in which each of said cylinder bores (Wn) of said cylinder block (w) coincides in center with each of said induction heating coils (23), wherein coordinates ((X1+(n−1)A+an), (Y1+bn)) of said position are measured;

9) move said X table (13) and said Y table (18) to a position of coordinates ((Xp+(n−1)A−an), (Yp−bn)) in which an inner surface of an n'th one of said cylinder bores (Wn) of said cylinder block (W) is subsequently subjected to an induction heating and a quenching operation, wherein said "an" and said "bn" are deviation values deviated from set values;

10) quench both said rows of cylinder bores (wn) of said Y-type cylinder block (W) in the same manner as that described above.

* * * * *